United States Patent Office 2,795,545
Patented June 11, 1957

2,795,545
ORGANIC MATERIALS

Earl W. Gluesenkamp, Dayton, Ohio, assignor to Monsanto Chemical Company, St. Louis, Mo., a corporation of Delaware No Drawing. Application April 14, 1953,
Serial No. 348,817

15 Claims. (Cl. 252—28)

This invention relates to improved organic materials. In certain aspects the invention pertains to organic liquids having incorporated therein adducts of polymeric organic materials with certain solids. In other aspects the invention pertains to solid organic materials having such adducts incorporated therein.

It is often desirable for industrial purposes to incorporate into various types of organic liquids and solids, finely divided solid materials which either acts as fillers or extenders, or which radically alter the characteristics of the said organic liquids or solids. For example, paper is often "filled" with clays. As another example, rubber, both natural and synthetic, is admixed with solids which act as fillers or extenders, or more desirably as reinforcing agents by increasing the stiffness of the rubber. Organic liquids of lubricating viscosity, usually hydrocarbon, but also non-hydrocarbon organic liquids such as esters, can be converted into greases by admixture therewith of solid gellation agents, especially clays, colloidal silicas, and clays or colloidal silicas that have been reacted with organic amines or organic surface active agents. Textile fibers, including natural fibers, such as wool, cotton, etc. and artificial fibers, such as rayon, nylon, acrylic fibers and the like are often treated with finely divided solids for the purpose of improving the twist, strength, opacity or other properties thereof. The foregoing are but a small number of examples of the numerous instances in which properties of liquid or solid organic materials are modified by addition thereto of finely divided solid matter.

In accordance with various embodiments of the present invention, organic liquids and solids, including the foregoing, are treated and/or admixed with adducts formed by reaction between (a) an inorganic solid that is gel forming in water and/or possesses ion exchange like properties and (b) a cationic polymer containing a substantially linear carbon molecular chain derived by the polymerization of at least one monoolefinic compound through aliphatic unsaturation. Said cationic polymers are herein termed "polycations." Methods of making said adducts and the adducts per se are disclosed and claimed in the copending application of Robert A. Ruehrwein, entitled "Chemical Product," Serial No. 348,809, filed of even date herewith to which reference is hereby made.

I have found that adducts of base exchange solids with polycations have the ability to modify in favorable ways the properties of organic liquids and solids. For example, admixture of bentonite with rubber does not significantly increase the modulus (stiffness) of the rubber. However, if such bentonite is reacted with a high molecular weight polycation, such as the copolymer of styrene with vinylpyridine, the resulting bentonite-polycation adduct has excellent reinforcing properties when admixed with the rubber. In an entirely different field of industry, the retention of clays in paper is improved if said clays, prior to admixture with the paper pulp during the paper making process, are converted into adducts of clay with polycations. It may be speculated that the modification of the clay surface caused by its reaction with cationic high polymer gives the clay greater affinity for the organic cellulosic materials of which the paper is made, although it is by no means certain that this theory explains the results obtained. It will be appreciated that of course not all adducts of ion exchange type solids with polycations will be full equivalents when used with all types of organic liquids and solids. Those skilled in the art, having been given the benefit of the present disclosure, will readily ascertain which combinations of ion exchange type solid, cation, and organic liquid or solid give the desired effect in any particular instance. Mixtures of organic liquids or solids with adducts of polycations with ion exchange solids in accordance with the present invention have numerous advantages over mixtures of such organic liquids or solids with previously known adducts formed from ion exchange type solids with low molecular weight organic amines. Thus, particularly in the case of copolymers of unsaturated amines and copolymerizable monomers, e. g. copolymers of 2-methyl-5-vinylpyridine with styrene, large amounts of organic material can be bound to the ion exchange type solid since the basic group in the polymer can carry with it a high percentage of non-basic organic material. The polycations derived by polymerization of at least one monoolefinic compound through aliphatic unsaturation are, when adducted with an ion exchange type solid, extremely stable and resistant to cleavage of the carbon chain by thermal or chemical means. These polycations are bound tightly to the active surface of the clay or other ion exchange type solid. Some base exchange sites are left unsatisfied in these adducts permitting further reactivity and affinity of the adducts with other materials. All of these differences are useful in one way or another when the adducts are mixed with various organic liquids or solids in accordance with the present invention.

An object of this invention is to provide improved organic materials. Another object of the invention is to modify the properties of organic liquids. A further object is to modify the properties of organic solids. Yet another object is to provide admixtures of organic liquids or solids with polycation-modified ion exchange type solids. A further object is to provide organic liquids or solids that have modified clays incorporated therein. A still further object is to improve the clay retention in paper making wherein clay is used as a beater additive. Another object is to provide reinforced rubbers. A further object is to provide oil base and oil-water emulsion base drilling muds. A further object of the invention is to provide greases. Yet another object is to provide plastic materials that have been extended by the incorporation therein of modified clays or other modified ion exchange type solids. A still further object of the invention is to employ polycation-ion exchange type solid adducts as friction improvers for textiles. Yet another object is to provide new destaticizers for plastics. Yet another object is to provide improved paints, varnishes, and other surface coatings. Another object is to modify the properties of waxes, inks, adhesives, synthetic fibers, and numerous other organic liquids and solids. Another object is to provide organic liquids and solids in admixture with inorganic gel-forming solids having high surface areas that have intimately bound thereto in adducted form a high proportion of organic material other than said organic liquid or solid. Further objects and advantages of the invention will be apparent to one skilled in the art from the accompanying disclosure and discussion.

It has long been known that clays and other inorganic solids having high surface area are capable of reacting with organic amines to form, presumably by base exchange reaction, adducts which, unlike the initial hydrophilic inorganic solids, are hydrophobic. The reaction has been applied particularly to base exchange clays reacted with "onium" compounds. Expanding lattice clays, e. g., montmorillonite, have hydrophilic surfaces, partly by virtue of sodium or other hydratable cations located at the surfaces of the ultimate layers of the clay. By replacement of these inorganic cations with certain organic cations, the clay surface can be made hydrophobic rather than hydrophilic by covering of the surface with hydrophobic material, e. g., hydrocarbon chains. This type of reaction has, up to the present time, been applied only to organic compounds having comparatively low molecular weight. Although it has been recognized that a marked change from hydrophilic to hydrophobic occurs only when the number of carbon atoms in an amine reacted with the clay is at least 10 or 12, the molecular weight of amines and other onium compounds heretofore subjected to reaction with clays has not been very high. The reasons for the silence of the art with respect to higher molecular weight materials is unknown, but in any event it is apparent that the quantity of organic material that can become associated with the clay is thus limited, inasmuch as only one molecule of amine or other onium compound can be taken up by each available base exchange site on the clay. The art recognizes that cation exchange sites are present on the faces of the montmorillonite layers, and hence it is logical to believe that there is a definite limit to the size of the molecule that can be introduced by this mechanism without encountering effects of hindrance by first-introduced molecules.

It has heretofore been suggested that an unsaturated monomeric radical, e. g., allyl or acrylyl, can be associated with montmorillonite by base exchange or other means, such as use of lead acrylate, and the resulting material then subjected to polymerizing conditions. Of course it is understandable in view of the detailed knowledge available of the structure of montmorillonites, that a low molecular weight unsaturated material could thus be introduced to the clay, but subsequent polymerization would be expected to be of limited value because of difficulty in initiating polymerization, low conversion, and low molecular weight due to immobility of monomers. Also, the exchange capacity of the clay strictly limits the weight of monomer that can be used.

In accordance with preferred aspects of the present invention, organic liquids and/or solids are admixed with and thereby have their properties modified by a new type of adduct. In preparing such adducts, inorganic solids that are gel-forming in water and/or that possess ion exchange like properties, e. g. clays, silica gel, alumina, are reacted with cationic polymers containing a substantially linear carbon molecular chain derived by the polymerization of at least one monoolefinic compound through aliphatic unsaturation. These materials with which the inorganic solid is reacted are herein termed "polycations." These polycations are high polymers which in water undergo electrolytic dissociation to give a positively charged polymer. The polycations to be used preferably have a molecular weight at least 10,000, and molecular weights above 15,000 are usually preferred. The molecular weight of suitable polycations is often in the range of 50,000 to 100,000 and even higher. However, low molecular weight polycations can be used in some instances, for example those having a molecular weight of say 5000, or less preferably as low as 2000 or even lower. Molecular weights referred to herein are those determined by the light scattering method described by Debye, Journal of Physics and Colloid Chemistry, 51, 18 (1947). Molecular weights determined by the light scattering method are weight average molecular weights; see Zimm and Doty, Journal of Chemical Physics, 12, 203 (1944). In practicing this invention the polycations are believed to become bound to the surfaces of the clay or other solid by forces much greater than those binding lower molecular weight, e. g., monomeric, basic compounds to such surfaces, which in turn permits a better affinity between the clay and the organic liquid or solid in which the adduct is incorporated.

Polycations with which the invention is principally concerned are those continuous carbon chain skeleton polymers having a plurality of recurring nitrogen-containing basic groups in the molecule such that upon dissolution or suspension in water the polymer becomes a positively charged molecule or particle.

The polycations are interacted with materials of the nature of hydrophilic substances that have base exchange capacity either in the sense of base exchange clays or which act in that manner many of which are also gel-forming in water. While the inorganic materials are preferred, organic base exchange materials, e. g., phenol-formaldehyde resin capable of cation exchange, can also be used for reaction with polycations and resulting adduct mixed with organic liquid or solid in accordance with the present invention. Generally speaking a solid that undergoes an ion exchange type of reaction is used, commonly referred to as ion exchange-adsorbent materials. Among the materials that can be used are hydrophilic inorganic materials having a high surface area and capable of taking up polycations by an apparent chemical bond by virtue of base exchange reaction or a phenomenon which resembles base exchange reaction. Suitable hydrophilic inorganic materials include those forming a gel in water such as oxides (including hydroxides) of alkaline earth metals, and polyvalent metals such as aluminum, iron, vanadium; certain phosphates, sulfides, and sulfates of heavy metals in gel form; silica, especially silica xerogels and aerogels. Artificial and natural aluminum silicates and modified aluminum silicates are particularly desirable, and those naturally occurring clays containing large proportions of montmorillonite and thus having high base exchange capacity are the preferred materials to use in the present invention. Special note is made of bentonite, hectorite, beidellite, nontronite, saponite. However, other types of clays can also be used, e. g., kaolinite, attapulgite.

When a naturally occurring clay is to be used, it is preferred that it be from a deposit which is essentially pure clay, or that it be subjected to known purification treatments to free it from non-clay material and produce an essentially pure clay, e. g., a material which is at least 95 weight percent clay. A conventional treatment involves suspension of impure mined clay in water, settling of non-clay impurities (sand, silt, etc.) and a separation of the settled impurities from the clay suspension; such suspension can then be used directly for reaction with polycation or the clay can be separated and dried for later use in reacting with polycation.

The phenomenon of base exchange in expanding lattice clays can be briefly summarized as follows with reference to typical swelling bentonites. The predominant mineral in bentonite clays is montmorillonite, a hydrous aluminosilicate consisting essentially of gibbsite, a hydrated aluminum oxide, condensed between two layers of silica. The platelet so formed has a thickness of about 10 angstrom units (A.) and variable lateral dimensions of an average value in the neighborhood of 2,000 A. Variable portions of the trivalent aluminum ions are replaced by divalent magnesium ions, or in other types of clays variable portions of silicon are replaced by aluminum, giving rise to a negative charge on the platelet. This negative charge is satisfied by cations present in or on the plate surfaces. In the naturally occurring clays, these cations are metallic cations such as sodium, calcium, etc. If this external ion is sodium as in Wyoming bentonite, the clay swells strongly in water, a result believed to be due partly to the large increase in volume of the sodium ion upon hydration and also to hydration of the surface of the plate. If the ion is hydrogen, or calcium or other polyvalent ion, the clays do not swell nearly so much in water, but are, however, considered a type of gel-forming solid for the purposes of this invention. The cation exchange capacity of bentonite or the like is given as the number of milliequivalents of exchangeable ions present in 100 grams of clay. Most clays have exchange capacities considerably below that theoretically possible due principally to the presence of impurities. Some 70 to 80 percent of the cation exchange sites are on the clay surfaces, and the balance on the edges. The c-axis spacing between clay layers is easily measured by standard techniques of X-ray diffraction.

The words, "hydrophilic" and "hydrophobic" are used herein to refer to the wettability and non-wettability of a substance by water. Considering for example kaolinite, it may be thought of in one sense as hydrophobic, since water does not penetrate throughout the molecule to form a solution, as water does with gelatin for instance. However, kaolinite is easily wet by water and tends to swell at least to a slight extent in water, so it is considered to be hydrophilic as the term is used herein. In preparing adducts for use in the practice of the present invention, hydrophilic substances are made (by reaction with polycations) hydrophobic, manifested by an increased resistance towards wetting by water.

I prefer to employ in the present invention adducts made from hydrophilic solids of the nature discussed herein having an ion exchange capacity of at least 20 milliequivalents per 100 grams.

Cationic polymers that can be used to prepare adducts for use in the practice of the present invention include homopolymers of vinylpyridines, e. g. 2-vinylpyridine, 4-vinylpyridine, 2-methyl-5-vinylpyridine, 2-vinyl-5-ethylpyridine; amino alkyl acrylates and methacrylates, e. g. dimethylaminoethylacrylate, β-aminoethylacrylate, dimethylaminoethylmethacrylate, dimethylaminobutylacrylate; vinylpiperidine; N,N-dimethylvinylamine; and others that will be mentioned herein. While the homopolymers of such materials are valuable in the practice of the invention, it is preferred to employ copolymers of same with other ethylenically unsaturated copolymerizable monomers, the latter preferably being non-basic. Said copolymers are advantageous, especially when containing at least 50 weight percent of a non-basic monomer polymerized therein, in that they permit the incorporation of very large quantities of organic material with the clay or other base exchange type solids. Copolymers containing down to as little as 5 weight percent basic monomer copolymerized with up to 95 weight percent non-basic monomer are useful in the present invention provided the particular copolymer has sufficient reactivity with the clay.

It is to be understood that when reference is made herein to polycations, or basic reacting polymers, or words of like import are used, any one of several different forms of such polymers is contemplated. Amino nitrogen-containing polymers are considered to be polynitrogen-containing polymers are considered to be polycations, etc., whether the nitrogen is in the trivalent or the pentavalent form. A most usual form of polymer is the quaternary wherein a basic polymer for example a polyvinylpyridine or other polymer containing a trivalent amino nitrogen atom is reacted with any of the known quaternizing agents. Such quaternizing agents include the acids, e. g. hydrochloric, acetic, sulfuric, paratoluenesulfonic, etc. Other suitable quaternizing agents are the organic halides especially the alkyl halides, e. g. methyl chloride, butyl bromide, dodecyl bromide. Other quaternizing agents are the esters, e. g. methylparatoluenesulfonate, methylsulfate, ethyl nitrate, alkylsulfonate esters, phosphate esters, alkyl or aryl sulfonyl halides, etc. The quaternized polymers are polycations in the strictest sense, inasmuch as upon their dissolution in water, they give rise by electrolytic dissociation to positively-charged polymer molecules. They are reacted with a sodium bentonite or other solid of the nature described herein, by base exchange type of reaction. This can be represented diagrammatcially in the case of polyvinylpyridine hydrochloride and sodium montmorillonite for example as shown in Equation 1 below, wherein the S represents a clay base exchange site, and P represents one pyridine group of a polyvinylpyridine. It will be appreciated that numerous quaternized pyridine groups may be present in a single polymer molecule and that numerous base exchange sites will be present in a single montmorillonite platelet.

$$PH^+Cl^- + S^-Na^+ \rightarrow SPH + Na^+Cl^- \quad (Eq. 1)$$

Of course, the foregoing reaction is an equilibrium reaction, but it has been found that the polycation is held quite firmly to the montmorillonite.

The basic polymer, instead of being first quaternized, can be reacted directly with an acid clay. Such acid clay can be made by simple treatment of a sodium montmorillonite or other clay containing exchangeable metallic cation with an aqueous solution of an acid in known manner. In this instance, the final product is the same, i. e., an adduct of a polycation with the clay. Equation 2 below shows diagrammatically the formation of an acid-substituted clay, while Equation 3 below shows the reaction of the acid-substituted clay with a polymer of vinylpyridine. It will be noted that the product is the same as that obtained by reaction (1) and reactions (2) and (3) together constitute a base exchange reaction mechanism. Nonquaternized basic polymers are considered herein as polycations.

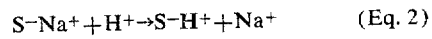

$$S^-Na^+ + H^+ \rightarrow S^-H^+ + Na^+ \quad (Eq. 2)$$

$$P + S^-H^+ \rightarrow SPH \quad (Eq. 3)$$

Various quaternary polyvinylpyridinium halides, and methods of making same, that can be used in the practice of the present invention are described in U. S. Patent No. 2,487,829. Similarly, reference is made to U. S. Patent No. 2,484,420, for a description of various quaternary salts of resinous linear addition type organic polymers which contain a basic tertiary nitrogen atom wherein the quaternizing agents are alkylsulfates, and alkylarylsulfonates, which can be employed in the practice of the present invention.

In preparing a quaternary polycation I usually use stoichiometrically equivalent quantities of quaternizing agent and basic polymer. However, in some instances it may be desirable to use less of the quaternizing agent leaving part of the basic groups of the molecule available for other reaction.

In most instances the adduct is formed by simply slurrying the finely divided clay or other gel-forming solid having high surface area and base exchange type of reaction in water together with the chosen polycation. The polycation may be completely water-soluble, or its solubility in water may be considerably limited, which is particularly the case with copolymers containing say 50 percent and above of non-basic monomers in the polymer molecule. In the case of such copolymers it may be necessary in some instances, especially those with the smallest percentage of basic groups in the molecule, to intimately admix the polymer with the clay particles in the presence of water as by ball-milling. Another effective method of preparing adducts from copolymers of the type described which are only slightly soluble in water is by a solvent-non-solvent system. Thus, for example, the polymer is dissolved in a suitable organic solvent. the clay is slurried in water, the two materials are brought together in the presence of an added hydrophilic organic solvent such as methanol or ethanol and with vigorous agitation, whereupon the adduct is formed and settles out. Suitable temperatures, concentrations, and times for effecting formation of the adducts will be greatly dependent upon the particular base exchange solid employed and the particular polycation. The most readily reactive materials are easily adducted at essentially room temperatures, e. g. 20° C., flocculation of the clay caused by adduct formation beginning immediately on admixture of the clay and polycation in water solution and being completed in a matter of minutes. In other instances it is desirable to increase the temperature substantially and to provide even several hours for sufficient reaction. Those skilled in the art, having been given the benefit of the present disclosure, will readily be able to determine by simple tests suitable conditions for effecting the reaction in any given situation.

The preferred adducts for admixture with organic solids or liquids in practicing the invention are those prepared by flocculation from a suspension of finely divided clay (or other suitable solid of the nature described herein) in a liquid medium, the flocculation occurring by virtue of reaction of the suspended solid with added polycation. The liquid is most often water, but organic liquids can be used, as indicated above, in which case it is ordinarily necessary that some water be present to effect reasonably rapid reaction between the base exchange type solid and the polycation. The suspension should contain at least 2 weight percent of the ion exchange solid. With a highly swelling clay in water the solids content should not exceed 6 percent or the material will set up in a gel on adding the polycation. A non-swelling system can contain higher percentage of solid. Ordinarily, however, the suspension should not exceed 30 percent solids. Much less preferably the chosen solid and polycation can be reacted by effecting direct intimate admixture by mechanical means, as by mixing in a kneader or ball-mill, rather than by means of flocculation from a suspension of solid in a liquid; in such direct mechanical intermixing, it is usually desirable to have some water present, or less preferably a non-aqueous liquid, in an amount sufficient to aid the mixing.

Regardless of the preparation method, the adducts should be used in the form of fine particles, preferably not larger than 100-mesh, i. e., not more than 1 percent retained on a No. 100 U. S. Standard Sieve. Drying of products made by wet methods usually causes formation of lumps, so that a final grinding step is desirable. The finished, isolated material is a non-aggregated finely divided pulverulent reaction product or adduct. In some instances it might be possible to use the adduct in other than finely divided form where the subsequent manufacturing step or steps, e. g. blending the adduct with rubber or plastics on a mill or with oil in grease-making machinery, results in breaking up of adduct particles so that it is ultimately in finely divided form.

The relative proportions of polycation and base exchange solids to be used can be varied over a considerable range. Factors influencing the quantitative interrelationships of the polycation and the base exchange solid will be discusssed more thoroughly hereinafter. However, it can be stated that I generally prefer to employ polycation in an amount that is at least 80 percent of the stoichiometric quantity, the latter value being based on the base exchange capacity of the base exchange solid in milliequivalents per 100 grams and upon the theoretical assumption of one cation group reacting with one base exchange site, there being of course numerous cation groups in a single polymer molecule. In other words, taking the case of the homopolymer of vinylpyridine, the number of milliequivalents of polymer is calculated on the basis of individual pyridine groups, not on the basis of individual polymer molecules. It is a curious fact that in making the adducts used in the present invention the base exchange solid seems in many instances to be able to take up far more than the equivalent quantity of polycation. Thus, satisfactory adducts have been made employing 200 percent of the stoichiometric quantity of polycation, and such quantities and even more are within the scope of the invention. As pointed out before, the use of copolymers enables the incorporation of a large proportion of organic material in the base exchange solid using only a limited proportion of cationic monomer in making the copolymer. It is apparent that the weight percent organic material in the final adduct can vary over a great range, but it should preferably be at least 3 weight percent and usually considerably more, for example 10 percent or more, for best results. For use in a particular organic liquid or solid, the adducts should contain sufficient polycation to exhibit organophilic properties towards said organic solid or liquid. One method of determining whether a solid is hydrophilic or organophilic is to shake the finely dvided material with a mixture of water and an organic liquid such as benzene and determine whether the material goes to the water phase, the interface, or the organic phase. Many of the adducts used in carrying out the present invention when tested in this manner will go to the interface or the organic phase. However, it is not to be considered necessary in each instance for the adduct to exhibit an organophilic nature as determined by this particular test, the criterion being rather its beneficial action in admixture with a particular organic solid or a particular organic liquid. The extent to which an ion exchange solid is rendered organophilic is affected not only by the relative proportions of the ion exchange solid and the polycation, but also by the components of the polycation, the molecular weight of the polycation, and the particular ion exchange solid.

As will appear more fully hereinafter, the cationic polymers can be prepared not only by polymerization of monomer or monomers containing a basic group but also by after-treatment of polymers containing reactive groups that are not basic but which can be made basic by such after-treatment. Thus, for example, acrylonitrile can be polymerized to form polyacrylonitrile, which can then be subjected to catalytic reduction whereby part or all of the nitrile groups are reduced to amino groups.

Useful polymeric cations are polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinyl amines may be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolytes are the polymers of products derived by the hydrolysis of amides and imides, such as N-vinylformamide, N-vinylacetamide, N-vinylbenzamide, N-vinyl-N-methylformamide, N-vinyl-N-methylacetamide, N-vinyl-N-methylbenzamide, N-vinylphthalimide, N-vinylsuccinimide, N-vinylformamide, and N-vinyldiacetamide. Similarly, copolymers of these various amides with other polymerizable monomers may be first prepared and subsequently hydrolyzed to the corresponding vinyl amine derivatives. The polyallylamines and polymethallylamines and copolymers thereof may be prepared by copolymerizing acrylonitrile or methacrylonitrile, alone or in the presence of other monomers, and then by hydrogenation converted into amine-containing polymers.

Suitable polycations can be made by polymerization of amides, N-alkyl substituted amides, N-aminoalkyl amides and the corresponding N-alkylaminoalkyl-substituted amides of unsaturated carboxylic acids, the aminoalkylacrylates, the aminoalkylmethacrylates, and the N-alkyl-substituted amino alkyl esters of acrylic or methacrylic acid, fumaric acid, maleic acid, and the like. Suitable polycations can be prepared from the esterification products of acrylic or methacrylic acid or other polymerizable unsaturated mono- or dibasic organic acids with alkylol amines, e. g., ethanol amine, triethanol amine, etc. These polymeric compositions can be the homopolymers or they can be copolymers with other copolymerizable monomers such as ethylene, propylene, isobutylene, styrene, α-methylstyrene, vinyl acetate, vinyl formate, alkyl vinyl ethers, acrylonitrile, methacrylonitrile, vinyl chloride, vinylidene chloride, the alkyl acrylates, the alkyl methacrylate, the alkyl maleates, the alkyl fumarates, and other olefinic monomers copolymerizable therewith. Polymers of this type can be prepared directly by the polymerization of suitable monomers, or by the after-chemical reaction of other polymers.

"Onium" polycations other than those of nitrogen can be employed to prepared adducts whose use is within the scope of the present invention, for example vinyl polymers containing sulfonium, phosphonium, arsonium, etc. groups. Various methods of making such polymers are known and available. Probably the most convenient method is to react an active halogen-containing polymer, e. g. polyvinylchloroacetate, with thioethers, tertiary phosphins, or arsines. By way of example can be mentioned the reaction product of a polymer of vinylchloroacetate ($CH_2ClCOOCH=CH_2$) with dimethyl thioether (dimethylsulfide, $CH_3SCH_3$), which can be named dimethylcarbo(polyvinyl)-oxymethylsulfonium chloride.

Polycations to be employed in making adducts for use in this invention can be prepared directly by the polymerization or copolymerization of one or more organic monomers with aliphatic unsaturation if at least one of said monomers contains a basic group. However, many types of polycations can be prepared instead by subsequent reactions of polymers and copolymers. For example, polymers containing nitrile groups can be hydrogenated to form amine-containing polymers. Still other types of polycations can be prepared by reacting halogen-containing polymers, for example the polymers or copolymers of vinylchloroacetate, allylchloroacetate, methylallylchloroacetate, or vinylchloroethyl ether, with amines to form amine salt radicals and quaternary ammonium radicals whereby what would otherwise be an insoluble polymer is converted to a water-soluble cationic polymer. It is also possible to subject a polymer to a plurality of reactions leading to the formation of polycation. For example, polystyrene can be chloromethylated by known procedure, and the resulting chloromethylated polystyrene then reacted with ammonia or amines, e. g. diethylamine, pyridine, etc. to form a polymer containing amine groups. Those skilled in the art will understand how to effect desired after-treatment of polymers to provide polycations having the desired extent of basicity and water-solubility. Homopolymers and copolymers of unsaturated carboxylic acid amides such as acrylamide, methacrylamide, crotonamide, their N-substituted derivatives, and the like, as made by many polymerization procedures are found to be cationic as evidenced by ability to flocculate clay from its suspension in water, such cationic character may be due at least partly to imide or other groups formed by chemical modification of the amide or substituted amide groups occurring during or after polymerization.

Polymers and copolymers are identified herein in terms of monomeric constituents. However, it is to be understood that the names so applied refer to the molecular structure of the polymer and are not limited to the polymers prepared by the polymerization of the specified monomers. In many instances polymers can be prepared from other monomers and converted by subsequent chemical reaction to the desired cationic polymer as described herein.

Thus, the various polycations of the types described herein can be termed "ethylenic" polymers, i. e., polymers prepared by "vinyl polymerization," that is, prepared by polymerization of at least one monoolefinic compound through aliphatic unsaturation, said polymers having numerous side chains distributed along a substantially linear continuous carbon atom chain. Moderate branching and cross-linking of this chain are permissible. The side chains can be all of one type or can be of different types so long as some contain basic groups, e. g. heterocyclic amino nitrogen groups, aminoalkyl groups, etc., the number of such groups and the relative proportions of hydrophilic and hydrophobic groups being such as to provide a polymeric compound having a substantially large number of ionizable radicals giving rise to a cationic polymer molecule by electrolytic dissociation in water. The length of the said continuous carbon chain is great, and is preferably such as to provide polymers having a weight average molecular weight of at least 2000. The continuous carbon chain is not easily broken because the carbon atoms therein enter into further reaction only with difficulty.

The polycations employed in the present invention may be water-soluble to the extent that they form apparently true homogeneous solutions or mixtures with water, or they may be more difficultly soluble polymers which expand in the presence of water and dissolve at least to some extent, and even included are some which are apparently insoluble in distilled water but which are capable of entering into base exchange reaction with the clay or other base exchange solid to be treated with such polymers. It will be understood of course that a polycation such as polyvinylpyridine or other amine-containing polymer in the free amine form, while it may not per se be appreciably soluble in distilled water, is included within the scope of the materials to be used inasmuch as its quaternized form is soluble and/or its free amine form is reactable directly by base exchange with a material such as acid-substituted montmorillonite.

Inasmuch as various procedures for effecting polymerization of ethylenically unsaturated monomers are so well-known in the art, it is not deemed necessary to go into much detail here. It will suffice to say that it is possible to make polycations whose adducts are suitable for the practice of the present invention by all of the various known polymerization techniques. These include mass or bulk polymerization, wherein the reaction mixture is free from added solvent or other reaction medium and consists solely of monomers, resultant polymers and catalyst, if any. Alternatively, the polymerization can be carried out in water solution in the case of water-soluble monomers, in organic solvents in which either monomer or polymer or both are soluble, or can be effected by the suspension or emulsion polymerization techniques. For suspension polymerization a reaction medium such as water is used together with a small amount of a suspending agent, for example water-soluble vinyl acetate/maleic anhydride copolymer derivatives, carboxymethylcellulose, etc., to give a suspension of particles of initial monomeric mixture which particles grow in size as the polymerization proceeds yet are not of such small size as to result in a permanently stable latex. This is called "pearl" polymerization where the particles are of quite large size. Emulsion polymerization can be effected by employing water, a sufficient amount of emulsifying agent, for example a water-soluble salt of a sulfonated long chain alkyl aromatic compound or a surface active condensation product of ethylene oxide with long chain aliphatic alcohols or mercaptans, etc., along with vigorous agitation whereby an emulsion of the reactants in water is formed and the product is obtained in the form of a latex. Such latex can then be coagulated if desired by known methods and the polymer separated from the water, or it can be subjected to quaternizing treatment with water-soluble quaternizing agents without direct separation of polymer from the aqueous medium.

Suitable catalysts for polymerization include the "per" compounds and the "azo" compounds. Furthermore many polymerizations can be effected in the absence of any added catalysts, or can be promoted by ultraviolet irradiation. The peroxide-type and the azo-type polymerization catalysts are of the free-radical promoting type. Peroxide catalysts can be inorganic or organic, the latter having the general formula $R'OOR''$ wherein $R'$ is an organic radical and $R''$ is an organic radical or hydrogen. These compounds are broadly termed "peroxides" and in a more specific sense are hydroperoxides wherein $R''$ is hydrogen. By way of example of "per" compounds can be mentioned benzoyl peroxide, di-tert. butyl peroxide, tert.-butyl hydroperoxide, cumene hydroperoxide, hydrogen peroxide, potassium persulfate, perborates, etc. Azo-type polymerization catalysts are characterized by the presence in the molecule of the group —N=N—; the dangling valences can be attached to a wide variety of organic radicals with each one however being preferably attached to a tertiary carbon atom. By way of example can be mentioned $a,a'$-azodiisobutyronitrile, diazonium halides, etc.

Among the materials within the scope of the present invention are lubricants, especially greases. To make these materials a suitable organic lubricating liquid is admixed with a selected quantity of a polycation-ion exchange type solid of the type described herein. A small quantity of the adduct serves to increase the thickness of the liquid without bringing it to a gel consistency. A larger amount of the adduct can be used alone or together with other gelling agents of known type, to form a gel or grease. Usually the amount of adduct to make the grease will be within the range of 2 to 20 weight percent of the total grease composition, and in any event the adduct will be a minor amount of the composition, i. e., less than 50 weight percent. Hydrocarbon lubricating oils, especially those derived from petroleum, are usually the cheapest and the most advantageous. However, for special purposes synthetic lubricating oils can be used alone or in admixture with petroleum oil. Included in such synthetic oils are those of lubricating viscosity obtained by olefin polymerization as in the presence of a Friedel-Crafts catalyst, by condensation of olefin polymers with aromatic hydrocarbons, by reaction of hydrogen with carbon monoxide by Fischer-Tropch synthesis, by hydrogenation of asphalts, coal, etc., and by the formation of esters, especially alkyl esters, organic and inorganic acids, e. g. phosphate esters, phthalate esters, sebacate esters, all as are well-known to those skilled in the art. Lubricants are made in accordance with the present invention by any of the conventional oil-bodying or grease making procedures, which ordinarily involve heating the lubricating oil with the polycation-clay or other adduct while obtaining intimate admixture by vigorous agitation, for example with a ball mill or a paint grinding mill, followed by cooling. The cooling cycle will be chosen to give a grease of the desired properties. Particularly useful are adducts of polycations with bentonite clays and with aerogels of silica, magnesia, or alumina.

The present invention includes surface coatings. These coatings include paints for protection of woods, metal and other surfaces, lacquers, and printing inks. A paint generally comprises a pigment base such as white lead incorporated in a vehicle such as linseed oil to which may be added a drier or thinner. A printing ink generally comprises an ink base such as carbon black incorporated in an organic vehicle such as a bodied linseed oil, synthetic resin, or varnish to which may be added driers and thinners. The pigment base or ink base, as the case may be, is liable to settling when the material stands for an appreciable length of time. Also it is often desirable to control the viscosity or thickening of the coating composition during application. It is apparent that paints must be sufficiently thick that they stay in place without running until dried. Printing inks, usually subjected to fast drying in high speed presses, still must be sufficiently viscous to avoid running or bleeding prior to drying. In accordance with the present invention, adducts of polycations with clays or other ion exchange type solids as described herein are employed as thickeners and/or pigment-suspending agents in surface coatings. Those adducts should be used which have at least a slight gelling tendency in the particular coating composition. It is apparent that the order of mixing the various ingredients can be chosen in accordance with the materials being used and the desired type of coating composition. Likewise, the quantity of adduct to be used will vary greatly in accordance with these and other factors, but usually it is within the range of from 1 to 25 pounds per 100 gallons of final surface coating. The ingredients can be mixed by use of a ball-mill, multiple roll paint grinding mill, or other suitable methods. The vehicles which may be employed include the following: (1) oxygen convertible vehicles: A. drying oils, raw or heat processed; soybean oil, linseed oil, dehydrated castor oil, oiticica oil, China-wood or tung oil; B. drying oil modified varnishes: oleoresinous varnishes, drying oil modified alkyds, drying oils, copolymerized with unsaturated hydrocarbons; (2) thermal convertible vehicles: phenol-aldehyde condensation resins, urea-aldehyde condensation resins, melamine-aldehyde condensation resins, thermal convertible alkyl resins, silicone resins, hydrocarbon resins; (3) vehicles which cast films from solutions of volatile solvents: cellulose esters and cellulose ethers, vinyl copolymers, acrylic copolymers, chlorinated rubber, butadiene-styrene copolymers. Among the pigment and ink bases are the following: (1) active pigments: white lead (white), basic lead sulphate (white), red lead, zinc oxide (white), zinc chromate, basic lead silicate (white); (2) inactive pigments: A. metal oxides and derivatives: titanium dioxide (white), zinc sulphide (white), antimony oxide, iron oxide, lead chromate, iron blue, copper phthalocyanine blue; B. others: organic toners and dyes, carbon black, bone black; (3) extenders: whitings, talc, barytes, diatomaceous silicate, China clay, mica.

Paper containing polycation-ion exchange type solid adducts can be prepared in accordance with this invention. The adducts are useful as beater additives. Added to paper pulp during the paper making process, the adducts serve as fillers in the finished paper. One feature of this embodiment of the invention is the increased retention of the filler as compared with the use of untreated clay as filler. Increased retention of course minimizes loss of filler from the paper making process which lost filler would be discarded or would have to be recovered for reuse. One traditional fault of paper is its "two-sidedness" resulting in part from clay being sucked away from the underside of the sheet during its formation. This phenomenon is particularly serious in the case of a dyed paper; two-sidedness in this case leads to obviously uneven coloring and waste in dye. Hence, increased retention of filler minimizes the differences between the two sides of the paper with resultant advantages. The adducts are also useful in paper coatings. Paper coatings are applied for a variety of purposes, usually to give a smooth surface to the paper which improves the appearance of the paper and/or aids clear printing. Particularly desirable adducts for use as paper fillers and/or coaters are those of kaolinite and other white clays, since in only a few instances is a colored material permissible. Also, because of economic factors kaolinite and other of the more inexpensive clays are preferred. Such clays are reacted with polycations, especially cationic copolymers, by methods described herein. The quantities of adduct to be employed of course will vary greatly depending upon the weight of filling desired and/or the type and weight of surface coating, but will readily be chosen by those skilled in the paper art in accordance with the needs of a particular situation.

Filled, extended, and/or reinforced rubbers are also products within the scope of the present invention. As used herein the term "rubber" includes both natural rubber and synthetic rubbers. Particularly valuable synthetic rubbers are those prepared by polymerization of a monomeric material comprising a conjugated diolefin, e. g., butadiene, isoprene, chloroprene, etc. However, other synthetic rubbers, including silicone rubbers, are within the scope of the invention. Copolymers of a major portion of butadiene with a minor portion of styrene, acrylonitrile, or other copolymerizable monomers now make up the great bulk of the synthetic rubber manufactured. Methods of making same and their properties are well-known to the art. Natural and synthetic rubbers for most uses require reinforcement. Probably the commonest material used for this purpose is carbon black. However, this obviously gives a black rubber and where a white or light tinted rubber composition is required, there is great need for reinforcing agents other than carbon black. Also for many purposes considerable amounts of fillers can be used without adversely affecting the physical properties. Adducts of polycations with clays, silicas, alumina, and other ion exchange type solids as described herein are useful as fillers, extenders and/or reinforcing agents in rubbers. The adducts are incorporated with the rubber composition and other components of the final rubber mix on rubber mills, in Banbury mixers, or by other techniques common in the industry. Ordinarily the final rubber mix is then vulcanized. The quantity of the adduct used will of course depend upon its properties in the rubber mix and the particular rubber, adduct and other ingredients to be used. The quantity may range from 1 part up to 50 parts by weight per 100 parts of rubber.

The adducts described herein are also useful in admixture with solid plastics, both of the thermoplastic and thermosetting type. Generally the adducts serve as fillers or extenders, although in some instances they give marked improvements in physical properties. The adducts are more compatible with the plastics than untreated clays and thus are more readily dispersed therein. For example, adducts of the type disclosed in this application can be milled into or can be present during the polymerization step leading to the formation of vinyl polymers such as polystyrene, polymethyl methacrylate, polyvinyl chloride and related polymers and copolymers. The adducts can also be incorporated in thermosetting resins, being admixed with the resin prior to the time it is caused to harden by heating. Such resins are well-known and include urea-formaldehyde resins, melamine-formaldehyde resins, phenolic resins, and the like. The quantity of adduct to be used will depend upon the purpose of adding the adduct and will seldom exceed 50 weight percent of the final plastic or resin. The adduct may often be useful in amounts as low as 1 weight percent of the mixture. Certain of the adducts, particularly those containing a high proportion of cationic groups not satisfied by reaction with base exchange sites in the clay or other solid, minimize the accumulation of static charges on plastics. This effect can be increased by coating a plastic body with the adduct or with a plastic containing a high proportion of the adduct.

Oil base drilling muds and oil-water emulsion drilling muds can be prepared by use of adducts as described herein. Drilling muds are employed in drilling wells, particularly deep wells for the finding and production of oil and gas, by the rotary method. The mud is forced down through the drill stem, out across the bit where it serves to lubricate the bit, cool the bit and pick up the cuttings, and back to the surface whereby cuttings are removed from the well. A drilling fluid carries solids suspended therein which serve to give the material thixatropic properties (i. e. the ability to gel on standing), increased viscosity, and which particles form a filter cake on the wall of the well. Oil base and emulsion base drilling muds are particularly useful in drilling through heaving sale and other formations adversely affected by water. The fluid loss of such drilling muds into the earth formations being drilled through is exceptionally low. In accordance with one embodiment of the present invention a small quantity of an adduct of the type described herein, for example from 1 to 40 pounds per barrel, is incorporated in a hydrocarbon oil, such as crude oil, kerosene, fuel oil or diesel oil. Other solids and additives can be employed if desired. The adduct is used in a quantity sufficient to increase the viscosity and give thixatropic properties to the resulting drilling mud but insufficient to increase the viscosity to an extent preventing pumping of the mud. Amounts from 1 to 40 pounds of adduct per barrel of drilling mud can be used, the particular amount depending upon the type of oil base, any other materials added, and on the requirements of the particular well being drilled. An emulsion base mud can be made in a similar manner but a quantity of water is intimately admixed with the oil phase. The emulsion can be of the oil-in-water type or the water-in-oil type depending upon the relative proportions of oil and water employed and depending somewhat upon the adduct and other solids employed and the absence or presence of added emulsifying agents. Quantities of from 1 to 40 pounds adduct per barrel of emulsion base drilling mud are usually adequate for most purposes. Some of the adducts described herein are also useful in water-base drilling muds, especially those adducts containing only a small quantity of polycation sufficient to improve low base exchange clays and increase the yield of mud therefrom, measured as number of barrels of mud of 15 centipoise viscosity obtainable from one ton of clay.

In accordance with the present invention adducts as described herein can be used in adhesives, as opacifiers and delustrants in synthetic fibers, e. g. acrylic fibers, polyester fibers, as friction improvers on textile fibers, e. g. wool whereby less twist is required in forming threads, and as fillers and extenders in natural and synthetic waxes. Numerous other applications of the present invention will occur to those skilled in the art in view of the present disclosure, the essence of the invention being that adducts of polycations with ion exchange type solids are organophilic in nature and modify the properties of organic solids and liquids contacted, treated with or admixed with said adducts.

The following examples set forth certain polymer preparations and the formation and use of certain clay-polycation adducts, to illustrate some of the preferred methods useful in practicing the invention. Examples 1–18 pertain especially to adduct preparation and properties, while Examples 19–21 described in detail improvement of organic solids and liquids by use of the adducts. It will be understood that numerous variations in the materials, proportions and procedures can be made without departing from the invention. Parts are by weight unless otherwise stated.

EXAMPLE 1

Adducts of a Wyoming bentonite high in montmorillonite content with poly-$\beta$-dimethylaminoethyl methacrylate hydroacetate were made using varying ratios of 1 to the other. One suitable method for preparing the polycation is as follows:

10 parts dimethylaminoethyl methacrylate
3.86 parts glacial acetic acid and
0.2 part potassium persulfate in
90 parts of water.

Hold overnight at 70° C. and then dilute with water. Any other suitable method of making the polycation can be employed, including polymerizing the dimethylaminoethyl methacrylate as such and then reacting the polymer with acetic acid.

In one preparation, 0.665 part of the polycation, $\beta$-dimethylaminoethyl polymethacrylate hydroacetate, was dissolved in 650 parts of water. To this solution was added 1 part Wyoming bentonite and the mixture stirred until the bentonite was thoroughly wetted. The water was removed by evacuation at room temperature, placed in a vaccum desiccator over calcium sulfate, and finally dehydrated in a vacuum desiccator over $P_2O_5$.

In like manner, adducts at the same bentonite with the same poly-$\beta$-dimethylaminoethyl methacrylate were prepared containing respectively 0.35, 0.075 and 0.202 weight polycation per weight of bentonite.

Samples of each of the adducts were sealed into glass capillary tubes, X-ray diffraction patterns obtained by standard procedures, and the characteristics C-axis spacing of montmorillonite was measured with the following results:

*C-Axis of montmorillonite treated wtih polycation*

| Polymer Per Weight Clay | Distance, Angstrom Units |
| --- | --- |
| 0 | 9.7–10.1 |
| 0.035 | 11.8 |
| 0.075 | 11.4 |
| 0.202 | 12.8 |
| 0.665 | 14.4 |

These results demonstrate that the polycation is adsorbed on the faces of the montmorillonite layers, presumably by means of cationic exchange. The C-axis increases with increasing proportions of the polycation. However, none of the values is greater than that of the untreated clay by more than 4.7 Angstrom units. A value of 13.6 Angstrom units would be a separation of 3.9 Angstrom units which is the Van der Waals thickness of a methylene group. Thus, it is believed likely that the hydrocarbon portion of the polycation lies essentially parallel to the clay surfaces, held there by Van der Waals forces. The gradual increase in layer separation with greatly increased proportions of polycation may be interpreted as indicating that overlapping of the polycation molecules is occurring to a gradually increasing extent. However, as will be discussed in more detail hereinafter the amount of overlapping must be small and this is in marked contrast to adducts of montmorillonite with simple long chain amines in quantities that cover more than 50 percent of a single face of montmorillonite, which result in a layer separation equal to two methylene group thicknesses. It is believed that there is a fundamental difference in the adducts of montmorillonite with polycations made in accordance with this invention, and the adducts of montmorillonite with comparatively low molecular weight amines in that the polycations have numerous basic groups scattered along the carbon chain skeleton, some of which can become associated with base exchange sites on the face of one plate while others in the same molecule can become associated with base exchange sites on the face of an adjacent plate, preventing the build-up of two complete organic layers, one on each face of adjacent plates which together would result in the layer separation equivalent to the thickness of two methylene groups.

EXAMPLE 2

Polyvinylbutylpyridonium bromide was prepared as follows:

A mixture of 140 parts of freshly distilled 2-vinylpyridine, 2800 parts of toluene and 5.6 parts benzoyl peroxide was deaerated by bubbling nitrogen through for 15 minutes, and the capped container placed in a water bath at 43° C. for 3 days. The solid polymer was filtered, washed with toluene, dissolved in pyridine and reprecipitated from toluene. A mixture of 20 parts of this polyvinylpyridine, 340 parts of nitrobenzene and 77 parts of n-butyl bromide was held at 55° C. for 4 days and the excess nitrobenzene and butyl bromide were removed by evaporation at room tempertaure. The polyvinyl N-n-butylpyridonium bromide was dissolved in ethanol, reprecipitated from dioxane, and filtered.

Two parts by weight bentonite clay, 1 part by weight of the polyvinylbutylpyridonium bromide and 300 parts of water were intimately admixed and then slowly evaporated to dryness on a steam bath. This resulted in the formation of a thin film which was more resistant to water than was the non-treated bentonite film formed in the same manner.

EXAMPLE 3

In this example a sodium bentonite from Wyoming, having a cation exchange capacity of 89 milliequivalents per 100 grams of clay (oven-dry) was used. The clay as received and before oven drying contained 7.8 percent water and about 10 percent non-montmorillonitric minerals. If the exchange capactiy of 89 is corrected for water and for non-clay minerals, the clay would have an exchange capacity of about 10 milliequivalents per 100 grams of pure clay. The particle size was 200 mesh or less.

Poly-2-methyl-5-vinylpyridine was prepared by mass polymerizing freshly distilled inhibitor-free 2-methyl-5-vinylpyridine at room temperature for 60 days. No catalyst was added, and no attempt to exclude atmospheric oxygen was made other than corking of the polymerization vessel. A clear amber polymer with a specific viscosity of 0.3 (0.1 percent solution in dimethylformamide) was obtained.

To a suspension of 148 parts of the bentonite in 3000 parts of water was added an aqueous solution containing 100 milliequivalents each of the poly-2-methyl-5-vinylpyridine and hydrochloric acid. The clay was immediately and completely flocculated. The material was filtered off, washed to remove soluble salt (NaCl) and dried and ground.

The product was difficultly wetted by water, easily wetted by polar and non-polar organic liquids, and increased in volume about two-fold in nitrobenzene. It was easily dispersed in synthetic resins.

EXAMPLE 4

A copolymer was prepared by emulsion polymerization of a monomeric mixture consisting of 50 parts by weight styrene and 50 parts by weight 2-methyl-5-vinylpyridine, using a 2.5/1.0 water/monomer weight ratio, 0.1 percent potassium persulfate as catalyst, 4.5 percent rubber reserve soap as emulsifier, and a 1.5-hour polymerization period. The polymer was isolated from the emulsion by freezing, thawing, filtering and washing. Specific viscosity of the polymer was 0.09 (0.1 percent solution in dimethylformamide).

The hydrochloride of this styrene/methyl vinylpyridine copolymer was prepared by reacting the copolymer with the equivalent amount of hydrochloric acid in aqueous solution. The resulting aqueous solution of the hydrochloride was thick and stringy.

The hydrochloride of the copolymer, in the amount of 23.8 parts, was reacted with a suspension of 118 parts of the sodium bentonite described above in Example 3, suspended in 3000 parts water, producing immediate flocculation. Hydrophobicity, organophilicity and swelling nitrobenzene were all more marked in comparison with the product of Example 3.

EXAMPLE 5

Examples 3 and 4 can be repeated, except using acetic acid in place of hydrochloric acid, and substantially the same results will be obtained.

EXAMPLE 6

The N-methyl p-toluenesulfonate quaternary salt of the 50/50 styrene/methylvinylpyridine copolymer described in Example 4 was prepared by reaction of the polymer (23.8 parts) with the equivalent amount (18.6 parts) of methyl para-toluenesulfonate at reflux in ethanol for 24 hours. Both the polymer and its quaternary salt were soluble in ethanol. The ethanol solution of the quaternary was diluted five-fold with water without formamide of a precipitate, indicating complete reaction. This water/ethanol solution was reacted with 118 parts of the sodium bentonite described in Example 3 to give thorough flocculation. The clay-polymer adduct assayed 16.6 weight percent carbon.

This polycation-clay adduct when coprecipitated with GR–S latex exhibited good reinforcing action on the synthetic rubber.

EXAMPLE 7

The N-butyl bromide quaternary salt of the 50/50 styrene/methylvinylpyridine copolymer described in Example 4 was successfully prepared in dioxane and in ethanol solutions. The quaternary could not be prepared satisfactorily in benzene solution. Aqueous solutions of the stoichiometric quantity of the N-butyl bromide quaternary with Wyoming bentonite gave good flocculation of the clay to produce an adduct.

EXAMPLE 8

A 70/30 styrene/methyl vinylpyridine copolymer was prepared by an emulsion polymerization identical with that used for the 50/50 copolymer except that only 0.05 percent potassium persulfate was used.

Attempts to prepare the hydrochloride or acetate of this polymer in aqueous solution were unsuccessful. Milky suspensions containing free acid and undispersed polymer were obtained.

Preparation of the hydrochloride and reaction with bentonite was effected by ball-milling the polymer in the stoichiometric amount of dilute hydrochloric acid until a smooth slurry was obtained. The requisite amount of bentonite suspension was then added, and ball-milling continued. The resulting polymer-clay slurry appeared completely flocculated. Some polymer could be extracted with benzene from the dried product indicating incomplete reaction.

EXAMPLE 9

Another method of preparing the hydrochloride and reacting it with clay produced a more completely reacted product than in Example 8, since no free polymer could be extracted. The copolymer described in Example 8 was dissolved in benzene containing the equivalent amount of concentrated hydrochloric acid. No difficulties in dissolving the acid or polymer in benzene were encountered. After solution was complete, ethanol was added in portions with shaking until the point of incipient precipitation was reached. The total volume of alcohol added was equivalent to the original solution volume. The required amount of dry bentonite was slurried in the solution in a Waring Blendor. No reaction was noted. A three-fold excess of water was added slowly with violent agitation. The mixture thickened progressively until about ⅓ of the water had been added, and thinned with further addition. The final mixture was a smooth, thick, white cream. After the reaction mixture stood for 30 minutes, two layers were present: a lower clear aqueous layer which was removed, and a stiff white paste which oozed water when kneaded. The mass was dried at room temperature with intermittent kneading and decantation of expressed water, until no odor of benzene could be detected. The now-friable mass was dispersed in ethanol in a Waring Blendor, and allowed to settle. The moist sediment was added to an equal volume of benzene. Some swelling was noted. The slurry was dried at room temperature, to form a chalky white mass with a brown, translucent horny skin on the surface. No polymer could be extracted from either portion.

EXAMPLE 10

A preparation similar to that of Example 9 was made using methyl ethyl ketone as the organic liquid and omitting the ethanol dilution. Thickening during addition of water was much reduced and the final mixture was a thin suspension which did not completely settle out on standing. Flocculation was induced by boiling off the bulk of the methyl ethyl ketone, and the product isolated by conventional procedures. No free polymer could be extracted from the product with benzene.

EXAMPLE 11

By the same procedure used in Example 10, the N-methyl para-toluenesulfonate quaternary salt of the 70/30 styrene/methylvinylpyridine copolymer was prepared in methyl ethyl ketone. No free polymer could be extracted from the product.

EXAMPLE 12

A 90/10 styrene/2-methyl-5-vinylpyridine copolymer was prepared by emulsion polymerization using the same recipe used for the 70/30 styrene/methylvinylpyridine copolymer described in Example 8. Aqueous solutions of the hydrochloride or hydroacetate could not be prepared satisfactorily.

Sodium bentonite in the amount of 11.8 parts was slurried in a solution containing 11.9 parts of the 90/10 styrene/methylvinylpyridine copolymer, 1.86 parts methyl para-toluenesulfonate, and 45 parts benzene. The slurry was homogenized with 500 parts water in a Waring Blendor to give a stiff white paste which oozed water on kneading. The paste dried at room temperature to a friable mass that swelled in benzene, in methyl ethyl ketone, and in toluene.

EXAMPLE 13

The hydroacetate of the 90/10 styrene/methylvinylpyridine copolymer described in Example 12 was prepared and reacted with clay by the benzene/ethanol system described in Example 9. The result was a completely reacted clay-polymer adduct.

EXAMPLE 14

N - methyl poly - 2 - methyl - 5 - vinylpyridinium p-toluenesulfonate was prepared by reacting equimolar amounts of PMVP and methyl p-toluenesulfonate in dioxane solution. After about 30 minutes at room temperature, the polymer quaternary salt precipitated. The dioxane was decanted, and the precipitate dissolved in water. The aqueous solution was reacted equimolecularly with a bentonite suspension to give thorough flocculation with resultant separation of polycation-bentonite adduct.

X-ray diffraction can be used to determine the C-axis spacing of montmorillonites. For a dry sodium bentonite this spacing is 9.6 Angstrom units. If the amount of adsorbed water is plotted against C-axis spacing, a continuous curve with inflections corresponding to integral layers of water is obtained.

Liquids other than water are also adsorbed between clay plates, notably polyhydroxy compounds like ethylene glycol, but here the continuous curve is replaced by a sharp equilibrium spacing corresponding to an integral layer of the liquid. This increased spacing corresponds closely to the Van der Waals dimensions of the adsorbed molecule, or to multiples thereof. For example, ethylene glycol in equilibrium with bentonite gives a C-axis spacing of 17.1 Angstrom units. Subtracting 9.6 Angstrom units, the basal spacing, we get 7.5 Angstrom units, corresponding to twice the Van der Waals thickness of the glycol molecule.

Replacement of the sodium ion by organic cations gives similar results. Propylammonium bentonite gives a C-axis spacing of 13.5 Angstrom units, corresponding to a separation of 3.9 Angstrom units, or the Van der Waals thickness of a methylene group. This would indicate that hydrocarbon portion of the exchange cation lies essentially parallel to the clay surfaces, held there by Van der Waals forces. That this is true is indicated by the fact that increasing the chain length of the hydrocarbon up to a maximum of 10 carbon atoms, does not affect the plate separation.

For a 12-carbon chain, however, the separation jumps to 7.8 Angstrom units, or a double layer of methylene groups. This indicates a relation between the area of the parallel hydrocarbon and the total clay surface. The area per cation exchange site of the clay surface was computed and found to be 165 square Angstrom units for a clay with exchange capacity of 100 milliequivalents per 100 grams. Hydrocarbons with 10 or less carbon atoms would have areas less than half this value, so two clay surfaces, each less than 50 percent covered by hydrocarbon, can approach each other to within the distance determined by a single hydrocarbon layer.

A hydrocarbon with 12 or more carbon atoms would have an area covering more than 50 percent of the clay area, and it would be impossible for two clay surfaces so covered to approach closer than a double thickness of hydrocarbon.

The behavior of polycationic materials on clay exhibit anomalies from the foregoing behavior. X-ray diffraction data on a number of adducts of clay with polycations are set forth in detail in the table below. Although the polymers used range from 53 square Angstrom units (32 percent clay surface coverage) in area per cation unit for polymethylvinylpyridine to 461 square Angstrom units (280 percent clay surface coverage) for the 90/10 styrene/methylvinylpyridine copolymer, the plate separations of all of these products clustered about the value of 4 Angstrom units or a single organic layer. (The separation of 7.7 Angstrom units in one instance is as yet unexplained.)

the source of the negative charge. Since the distance between charges on a polycation are more or less predetermined, if this distance is not a good match for the separation between ionic sites on the clay, good approximation of a polycation to the clay surface is made unlikely.

Evidence for the lack of order can be drawn from the shapes of the C-axis spacing peaks recorded by X-ray diffraction spectrometer. For polycations on bentonites, these peaks are broad, indicating a wide distribution of plate separations, and of low intensity, indicating relatively few plate packets of a given constant separation.

The benzidine color reaction also gives evidence for disorder in these systems. Benzidine, and other aromatic amines, form intensely colored complexes with montmorillonite surfaces. The intensity of color when organo-bentonites are treated with benzidine would be a measure of the amount of clay surface not covered by organic material. Simple alkylammonium bentonites give only faint colors when the alkyl radical covers essentially all of the surface. However, all of the polycation-bentonites, even those where the computed area per ion for the polymer is more than enough to cover the clay surface completely, give relatively intense colors with benzidine. This can be taken to mean that while a stable polymer-clay complex from which free polymer cannot be extracted can be prepared by reacting the clay with a polycation, orderly and complete coverage of the clay surfaces is not attained. This means that there is still some surface

*X-ray diffraction data for polycation-bentonite derivatives*

| Ex. No. | Polycation | C-Axis Spacing, A. | Separation, A. | No. of Organic Layers | Width | Peak Intensity | Sq. A. Estimated Area Per Organic Unit | Estimated Percent Clay Area Covered* |
|---|---|---|---|---|---|---|---|---|
|  | None | 9.6 | none | none | medium | high |  | 0 |
| 3 | PMVP | 14.3 | 4.7 | 1+ | broad | medium | 53 | 32 |
| (a) | PMVP | 13.6 | 4.0 | 1 | ...do | ...do | 53 | 32 |
| (b) | MPVP (excess) | 13.0 | 3.4 | 1− | ...do | ...do | 53 | 32 |
| 14 | N-Me PMVP | 14.7 | 5.1 | 1+ | ...do | ...do | 59 | 36 |
| 4 | 50/50 S/MVP | 14.7 | 5.1 | 1+ | ...do | ...do | 98 | 59 |
| (c) | 50/50 S/MVP | 13.0 | 3.4 | 1− | ...do | low | 98 | 59 |
| 6 | N-Me 50/50 S/MVP | 13.8 | 4.2 | 1+ | ...do | medium | 104 | 63 |
| (d) | 70/30 S/MVP | 13.2 | 3.6 | 1 | v. broad | v. low | 159 | 97 |
| 11 | N-Me 70/30 S/MVP | 17.3 | 7.7 | 2 | ...do | ...do | 165 | 100 |
| 13 | 90/10 S/MVP | 13.4 | 3.8 | 1 | ...do | ...do | 461 | 280 |

*Based on 165 square A. of clay surface per exchange site.
PMVP = Poly-2-methyl-5-vinylpyridine.
N-Me PMVP = methyl-p-toluene sulfonate quaternary of PMVP.
S/MVP = Styrene/2-methyl-5-vinylpyridine copolymer.
(a) Preparation similar to Example 3.
(b) Preparation similar to Example 3, but 200% of the equivalent amount based on clay exchange capacity of polymethylvinyl-pyridine.
(c) Preparation similar to Example 4.
(d) Preparation similar to Example 9, but acetic acid.

Having obtained the information described herein, several conjectures to explain the behavior can be advanced. It is to be understood, however, that the invention is not dependent on any particular theory suggested here. First, a polycation is not restricted to attachment of all its ionic sites to a single clay surface, but can effectively bind two clay surfaces together to give a semi-cross linked system. This system is less free to swell in non-polar organic liquids than clays treated with simple amines. Second the orderliness of a reaction between a polycation and a clay surface may be much less than for a simple cation. Mutual interference of polymer chains in their approach to the clay surface, and premature approximation of two clay surfaces before they are completely saturated by polycation chains would prevent an orderly surface coverage and a high degree of perfection (indicated by the width of the C-axis spacing line in an X-ray diffraction pattern). Third, while the exchange sites are not believed to be fixed in a rigid array on the clay surface, Pauling's principle of micro-neutrality would demand that the cation approach as nearly as possible available on the clay which for many uses will be found very desirable inasmuch as a clay having a high organic content is available and yet still having limited clay surface available for other purposes.

From the foregoing discussion it will be seen, first that polycations have been shown to be capable of entering into the spacing between montmorillonite layers to a very important and substantial extent. It can be further seen that the proportion of polycation actually going between the clay layers and separating same is limited to an approximation of a mono-molecular layer. It follows then that there are of necessity many "tails" of cationic polymer "sticking out" from between the clay platelet in a free condition, i. e., not bound by chemical union with the clay particles. These portions of the polymer molecules, part of which are molecules between clay layers and bound thereto while the remainder is not, contain numerous cation units which therefore are available for other chemical reaction. Thus, there is provided a clay material containing a high content of organic matter and containing a large number of reactive amine groups still available for other reaction. It is apparent that this type of material is fundamentally different from adducts of clay with simple amines.

EXAMPLE 15

Acrylamide (20 grams) was dissolved in 80 grams dioxane, and 0.05 gram benzoyl peroxide was added. This mixture was polymerized in a pressure bottle with gentle tumbling at 63° C. for 48 hours, resulting in a solid white reaction mixture. The solid was digested in excess acetone, filtered and dried in a vacuum oven at 80 to 90° C. The yield of polymer was essentially quantitative. The polymer was soluble in water, and its specific viscosity (0.4 percent in water) was 0.27.

This polyacrylamide (its chemical constitution and the extent of modification, if any, of amide groups occurring during polymerization were not determined) was tested to determine its ability to flocculate kaolinite from a suspension of 4 grams kaolinite in 1 liter of water. The polyacrylamide in a concentration within the range of 100 to $1000 \times 10^{-6}$ equivalents per liter was sufficient to effect the flocculation.

A portion of the same polyacrylamide when reacted with bentonite (10 parts polyacrylamide/90 parts bentonite), resulted in an adduct having a C-axis spacing of 14.7 Angstrom units as determined by X-ray diffraction measurements.

EXAMPLE 16

One gram of a copolymer of 95 parts acrylonitrile with 5 parts vinylacetate was subjected to hydrolysis in 10 ml. concentrated sulfuric acid and 2 ml. water by standing at room temperature overnight. The resulting material was dissolved in about 40 ml. of water, then poured into an excess of ethanol in a Waring blendor. The alcohol was decanted from the gummy precipitate, more alcohol added and the polymer became hard. This material was filtered and dried in a vacuum oven at 50° C.

The thus-modified polymer was cationic as demonstrated by its ability, in a concentration of $200 \times 10^{-6}$ equivalents per liter, to flocculate a suspension of 4 grams kaolinite in 1 liter of water. As reference points, it can be noted that aluminum ion flocculates the same suspension in a concentration of $500 \times 10^{-6}$ equivalents aluminum ion per liter, and an extremely strong polycation, such as polyvinylpyridine hydrochloride, is effective in a concentration of $10 \times 10^{-6}$ equivalents per liter to flocculate the kaolinite suspension.

EXAMPLE 17

A total of 214.8 milliequivalents of polymethylvinylpyridine hydrochloride and octadecylamine hydroacetate in a molar ratio of 4:1, was dissolved in water and added to a 2 percent suspension of 214.8 milliequivalents of the sodium bentonite employed in the foregoing examples. Immediate and thorough flocculation occurred. The slurry was separated on bag filter and reslurried and refiltered until effluent was chloride-free. The cake was then slurried and filtered twice from ethanol and let dry at room temperature.

The swelling properties of this product in organic liquids was intermediate between similar products made exclusively with polymethylvinylpyridine and exclusively with octadecylamine.

EXAMPLE 18

Following are further examples of polycations that are suitable for reacting with gel-forming oxides having high surface area and/or base exchange reactivity in accordance with the present invention.

*Methacrylic acid (35%) / dimethylaminoethyl methacrylate (65%) copolymers.*—Six and one-half parts of dimethylaminoethyl methacrylate and 3.5 parts of methacrylic acid were dissolved in 90 parts of water and 0.02 part of potassium persulfate was added as a catalyst. The solution was heated at 60° C. overnight and then diluted to a 2 percent solution for use.

*Styrene/maleic acid-β-dimethylaminoethyl half-ester.*—Styrene/maleic anhydride copolymer was warmed with an excess of β-dimethylaminoethanol. A spongy mass formed from which excess alcohol was removed by squeezing and by washing with absolute ether. Two parts of air-dried polymer was dissolved in 100 parts of water.

*Polyvinylpyridine/acrylonitrile hydrosulfate.*—A copolymer of 70 percent vinylpyridine and 30 percent acrylonitrile was prepared by an emulsion system in which the monomer mixture was fed into an aqueous solution of soap stirred and heated at reflux temperature. This polymer was dissolved in a 5 percent sulfuric acid solution in such amounts that the sulfuric acid present was equivalent to the vinylpyridine present. This aqueous solution may be used directly with the application described.

*Polyvinylpyridine/acrylonitrile methyl - para - toluenesulfonate quaternary.*—The 70 percent 2-vinylpyridine/30 percent acrylonitrile copolymer, described in the preceding preparation, was dissolved to make a 5 percent solution in dimethylformamide. A stoichiometric amount of methyl-para-toluenesulfonate was added and the solution was heated at 60° C. for 5 hours. Essentially complete conversion to a quaternary was obtained. The polymer was isolated by pouring into acetone. This polymer is readily soluble in water.

*Polyvinyl chloroacetate pyridinium salt.*—Polyvinyl chloroacetate was prepared by a mass polymerization technique at 60° C. using 0.02 percent benzoyl peroxide as the catalyst. The polymer had a specific viscosity (in 0.1 percent dimethylformamide solution) of 0.30. Five parts of this polymer was dissolved in pyridine. After 2 hours stirring the polymer precipitated as the pyridinium salt of the polyvinyl chloroacetate. The slurry was heated at 80° C. for 2 hours to complete the reaction. The polymer was filtered off and dried and was found to be soluble in water. Chemical analyses indicate the essentially complete conversion of the chloroacetate groups to quaternaries.

*Polyacrylamide.*—Ten parts of acrylamide and 0.05 part of potassium persulfate were dissolved in 90 ml. of water and heated in an oven at 60° C. for 5 hours. Because of some hydrolysis the polymer contained some ammonium salt and imide groups in addition to acrylamide units. The solution was diluted with 400 ml. of water for use.

*Polyvinyl chloroacetate trimethylamine salt.*—A 5-gram sample of polyvinyl chloroacetate, prepared as in the preceding examples, was dissolved in 100 cc. of 25 percent trimethylamine aqueous solution. An aqueous solution of the trimethylamine salt of polyvinyl chloroacetate was thus obtained.

*Polyvinyl 2-chloroethyl ether.*—Vinyl 2-chloroethyl ether was polymerized in liquid propane containing crushed solid $CO_2$ using boron trifluoride catalyst. The polymer was isolated and purified by precipitation and dried (specific viscosity of 1 percent benzene solution equals 1.00). The polymer was dissolved in dimethylformamide and trimethylamine added and the solution heated. The resulting water-soluble polymer, containing quaternary ammonium salt groups as part of the polymer molecule, was isolated by precipitation in ether.

*Acrylamide/acrylonitrile copolymer.*—Ninety parts of acrylamide, 10 parts of acrylonitrile, 0.2 part of potassium persulfate and 0.1 part of sodium bisulfite were dissolved in 1 liter of 50 percent methyl alcohol and heated for 4 days at 60° C. The resultant precipitated polymer was then filtered, washed with methanol and dried. Two parts of this material was dissolved in 98 ml. of water.

EXAMPLE 19

Clay-polycation adducts were tested as reinforcing agents in GR–S synthetic rubber (butadiene-styrene copolymer). The adducts were incorporated by coprecipitation with the rubber from rubber latex. Dilute water slurries of the adducts were added to dilute (10 percent solids) latex, and the mixtures were then coagulated with 40 percent calcium nitrate. The resulting coagulae were washed and dried thoroughly before being mixed with compounding ingredients on the mill. Addition of adducts (A) and (B) caused coagulation of the GR–S latex, and subsequent addition of calcium nitrate caused an apparent settling out of the adduct. In these instances the separated rubber and adducts were dried thoroughly and then reblended during the milling operation.

For testing, the following A. S. T. M. procedures were utilized:

Milling and curing_____ A. S. T. M. D 15–50T
Stress-strain_____ A. S. T. M. 412–49T
Hardness_____ A. S. T. M. 314–39

Information on the clay-polycation adducts tested, and results of the tests, follow.

A. A 50/50 styrene/methylvinylpyridine - bentonite product made as described in Example 4 above.

B. The quaternary of methyl-p-toluenesulfonate with a 50/50 styrene/methylvinylpyridine copolymer reacted with bentonite as described in Example 6 above.

C. A 90/10 styrene/methylvinylpyridine-bentonite product made via hydrochloride and ball-mill method similar to the method described in Example 8 above.

clay or adduct content, based on separate ashing of clay alone and adduct alone. The adduct used in the present example was prepared by reacting the hydrochloride of a 90/10 styrene/methylvinylpyridine copolymer with bentonite, equal weights of the copolymer and the bentonite being employed. The data are as follows:

| Additive | Wt. added per sheet, g. | Wt. retained per sheet, g. | Retention, percent |
|---|---|---|---|
| Bentonite (control) | 0.603 | 0.418 | 69.3 |
| Bentonite-Styrene/Methylvinylpyridine Copolymer | 0.603 | 0.794 | up to 100 |

The high figure for retention of the bentonite-styrene/methylvinylpyridine adduct, which is greater than the weight of adduct added, is attributed to pick-up of alum by pyridine units present in the adduct which are not satisfied by reaction with base exchange sites on the bentonite. It will be appreciated that improvement of clay retention is very valuable inasmuch as in the control sample one-third of the added bentonite was not retained in making the paper sheet.

EXAMPLE 21

Use of clay-polycation adducts as extenders for polystyrene is illustrated in this example. Comparisons were

| Base Formula | Parts by Weight |
|---|---|
| Rubber as GR–S–IV Coagulum | 100.0 |
| Rayox (TiO₂) | 50.0 |
| Zinc Oxide | 5.0 |
| Sulfur | 1.5 |
| Santocure* | 1.2 |

*Santocure = N-cyclohexyl-2-benzothiazyl sulfenamide.

| Description | Amount Pts. by Wt. | Stress-Strain Data | | | | | | |
|---|---|---|---|---|---|---|---|---|
| | | Min. Cure at 144° C. | Shore "A" Hardness | Shore "D" Hardness | 300% Modulus, p. s. i. | 500% Modulus, p. s. i. | Ultimate Tensile Strength, p. s. i. | Ultimate Elongation, percent |
| Control | | 30 | 60 | 20 | 510 | 890 | 1,535 | 670 |
| | | 60 | 60 | 20 | 525 | 995 | 1,670 | 640 |
| | | 90 | 60 | 20 | 525 | 1,000 | 1,485 | 610 |
| Bentonite | 30.0 | 30 | 60 | 20 | 485 | 695 | 1,145 | 675 |
| | | 60 | 70 | 25 | 580 | 963 | 1,320 | 596 |
| | | 90 | 70 | 25 | 645 | 1,105 | 1,425 | 560 |
| Adduct A | 30.0 | 30 | 70 | 25 | 986 | | 1,220 | 476 |
| | | 60 | 70 | 30 | 1,246 | | 1,346 | 343 |
| | | 90 | 70 | 30 | 1,070 | | 1,266 | 396 |
| Adduct B | 30.0 | 30 | 75 | 30 | 950 | 1,193 | 1,250 | 536 |
| | | 60 | 75 | 30 | 1,136 | | 1,380 | 466 |
| | | 90 | 75 | 30 | 1,216 | | 1,343 | 373 |
| Adduct C | 30.0 | 30 | 65 | 20 | 365 | 555 | 1,050 | 705 |
| | | 60 | 70 | 25 | 565 | 945 | 1,490 | 615 |
| | | 90 | 70 | 30 | 490 | 1,005 | 1,555 | 600 |

It will be noted that adducts A and B were outstanding in reinforcing value as indicated by the values for 300% modulus. The light color of these adducts permits their use in reinforcing white rubber. All of the adducts gave slight increases in Shore Hardness over the values obtained with the same quantity of untreated bentonite. Adduct C gave somewhat lower modulus than bentonite alone, but gave significant increase in ultimate tensile strength and ultimate elongation.

EXAMPLE 20

The use of clay-polycation adduct as beater additive in paper manufacture is illustrated by this example. The adduct is retained in the paper better than untreated clay.

Standard paper pulp was treated with clay control and with adduct, respectively, the treated pulp in each instance sized with rosin and alum, and handsheets then prepared. The latter were then ashed. The ash content of the sheet was calculated back to the corresponding made with untreated bentonite, and with bentonite reacted with dioctadecylamine, sold commercially as "Bentone–34" and containing 29 percent organic matter plus 71 percent clay. One adduct tested was that of bentonite with polymethylvinylpyridine containing 9 percent polymethylvinylpyridine and 91 percent clay. The other adduct tested was 50 percent by weight of a copolymer of styrene with methylvinylpyridine (in a ratio of 90 parts styrene to 10 parts methylvinylpyridine) with 50 percent bentonite. These materials are designated as follows:

A. "Bentone-34"—dioctadecylamine bentonite product; 29 percent organic and 71 percent clay.

B. Bentonite—exchange capacity of 80 milli-equivalents per 100 grams of clay.

C. Copolymer-bentonite—50 percent copolymer of styrene (90 percent) and methylvinylpyridine (10 percent) and 50 percent bentonite.

D. Methylvinylpyridine-bentonite—9 percent polymethylvinylpyridine and 91 percent bentonite.

Glass tubes were charged with the solid additive and styrene, sealed under nitrogen, then placed in an oil bath maintained at 120° C. for polymerization. The tubes were removed for shaking every hour. The total polymerization time was 24 hours. Physical properties were determined on the polymer products as reported in the following table.

| Materials Tested | Tensile Test | | Flexural Test | | Notched Impact Strength, ft. lbs./in. |
|---|---|---|---|---|---|
| | Strength, p. s. i. Failure | Elong., percent Failure | Strength, p. s. i. Failure | Deflection, in. Failure | |
| A. 4 grams, Styrene, 26 g. | 6,000 | 1.12 | 12,400 | 0.09 | 0.15 |
| B. 4 grams, Styrene, 36 g. | 5,020 | 1.29 | 9,490 | 0.10 | 0.49 |
| C. 3 grams, Styrene, 27 g. | 5,540 | 1.66 | 9,190 | 0.13 | 0.26 |
| D. 3 grams, Styrene, 27 g. | 6,580 | 2.13 | 12,700 | 0.18 | 0.63 |
| Polystyrene | 7,100 | 1.8 | 15,200 | 0.18 | 0.41 |

Examination of the data shows that most of the physical properties of the polymerized styrene containing claypolycation adduct were only slightly less favorable than the corresponding properties for polystyrene per se, and some physical properties were improved. Particularly, adduct D, which is the reaction product of bentonite with polymethylvinylpyridine, had better elongation and impact strength, and the same flexural deflection, as polystyrene. Further, all properties of the polystyrene, containing the polymethylvinylpyridine-bentonite adduct D, were superior to the properties of polystyrene containing the "Bentone-34," and for the styrene/methylvinylpyridine copolymer-bentonite adduct C the elongation, flexural deflection and impact strength were superior to the product containing "Bentone-34." With the exception of somewhat poorer flexural strength and impact strength in the case of the styrene/methylvinylpyridine copolymer-bentonite adduct C, all other properties of both the polystyrene containing this adduct and the polystyrene containing the polymethylvinylpyridine-bentonite adduct D were superior to the properties of the polystyrene containing untreated bentonite.

While the invention has been described herein with particular reference to various preferred embodiments thereof, it will be appreciated that variations from the details given herein can be effected without departing from the invention in its broadest aspects.

I claim:

1. An organic material selected from the group consisting of papers, natural and synthetic rubbers, natural fibers, solid non-rubbery thermoplastic and thermosetting resins, liquid surface coating compositions, oil-containing drilling muds, and lubricating oils, modified in properties by treatment with not more than an equal weight of an adduct; said adduct being that of a high surface area hydrophilic substance possessing ion exchange properties with at least 3 weight percent of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

2. An intimate admixture of an organic material selected from the group consisting of papers, natural and synthetic rubbers, natural fibers, solid non-rubbery thermoplastic and thermosetting resins, liquid surface coating compositions, oil-containing drilling muds, and lubricating oils, with not more than an equal weight of an adduct; said adduct being that of a montmorillonite-containing mineral with at least 3 weight percent of a cationic synthetic high polymer containing a substantially linear molecular chain derived by the polymerization of at least one monoolefinic compound through aliphatic unsaturation, said polymer being bound through basic groups to base exchange sites on the surfaces of said montmorillonite-containing mineral.

3. An organic material selected from the group consisting of papers, natural and synthetic rubbers, natural fibers, solid non-rubbery thermoplastic and thermosetting resins, liquid surface coating compositions, oil-containing drilling muds, and lubricating oils, modified in properties by treatment with not more than an equal weight of an adduct; said adduct being that of a high surface area hydrophilic substance possessing ion exchange properties and free from non-ion exchange material with at least 10 weight percent of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

4. An organic material selected from the group consisting of papers, natural and synthetic rubbers, natural fibers, solid non-rubbery thermoplastic and thermosetting resins, liquid surface coating compositions, oil-containing drilling muds, and lubricating oils, modified in properties by treatment with not more than an equal weight of an adduct; said adduct being that of a bentonite with at least 3 weight percent of a cationic synthetic high polymer containing recurring nitrogen-containing basic groups in the molecule and a substantially linear molecular chain derived by the polymerization of at least one monoolefinic compound through aliphatic unsaturation, said polymer being bound through nitrogen-containing basic groups to base exchange sites on the surfaces of said bentonite.

5. An organic material selected from the group consisting of papers, natural and synthetic rubbers, natural fibers, solid non-rubbery thermoplastic and thermosetting resins, liquid surface coating compositions, oil-containing drilling muds, and lubricating oils, in intimate contact with not more than an equal weight of a hydrophobic material prepared by base exchange reaction between a substantially pure base exchange clay and an amount which is at least 3 weight percent and is at least 80 percent of the stoichiometric quantity, based on one vinylpyridine group per base exchange site, of a high polymer containing at least 5 weight percent vinylpyridine in the polymer molecule.

6. An intimate admixture of an organic material selected from the group consisting of papers, natural and synthetic rubbers, natural fibers, solid non-rubbery thermoplastic and thermosetting resins, liquid surface coating compositions, oil-containing drilling muds, and lubricating oils, with not more than an equal weight of a finely divided adduct; said adduct being that obtained by reacting, in the presence of water, a high surface area hydrophilic base exchange solid with at least 10 weight percent of a quaternized synthetic high polymer containing recurring amino nitrogen groups in the molecule and a substantially linear molecular chain derived by the polymerization of at least one monoolefinic compound through aliphatic unsaturation, and recovering, drying and grinding resulting adduct.

7. An organic material selected from the group consisting of papers, natural and synthetic rubbers, natural fibers, solid non-rubbery thermoplastic and thermosetting resins, liquid surface coating compositions, oil-containing drilling muds, and lubricating oils, modified in properties by intimate admixture with not more than an equal weight of an adduct; said adduct being that obtained by effecting a base exchange reaction, in the presence of water, of an alkali bentonite with an amount which is at least 3 weight percent and is at least 80 percent of the stoichiometric quantity, based on one vinylpyridine group per base exchange site, of a quaternized high copolymer containing between 5 and 50 weight percent vinylpyridine in the polymer molecule.

8. A rubbery diolefin polymer containing an adduct, in an amount of from 1 to 50 parts by weight adduct per 100 parts by weight rubbery polymer; said adduct being that of a high surface area hydrophilic substance possessing ion-exchange properties and free from non-ion exchange material with an amount, which is at least 3 weight percent and sufficient to decrease the hydrophilic nature of said substance, of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

9. A rubbery butadiene-styrene copolymer containing an adduct intimately dispersed therein, in an amount of from 1 to 50 parts by weight adduct per 100 parts by weight rubbery copolymer; said adduct being that of a bentonite with at least 3 weight percent of a high molecular weight copolymer of equal weights of 2-methyl-5-vinylpyridine and styrene, said latter copolymer being bound through pyridine groups to base exchange sites on the surfaces of said bentonite.

10. Paper containing not more than an equal weight of an adduct; said adduct being that of a substantially pure base exchange clay with at least 3 weight percent of a cationic synthetic high polymer containing a substantially linear molecular chain derived by the polymerization of at least one monoolefinic compound through aliphatic unsaturation, said polymer being bound through basic groups to base exchange sites on the surfaces of said clay.

11. Paper containing not more than an equal weight of an adduct; said adduct being that of a bentonite with an equal weight of a high molecular weight copolymer of 10 weight percent 2-methyl-5-vinylpyridine and 90 weight percent styrene, said copolymer being bound through pyridine groups to base exchange sites on the surfaces of said bentonite.

12. A thermoplastic organic resin containing intimately dispersed therein not more than an equal weight of an adduct; said adduct being that of a high surface area hydrophilic substance possessing ion exchange properties and free from non-ion exchange material with an amount, which is at least 3 weight percent and sufficient to decrease the hydrophilic nature of said substance, of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

13. Polystyrene prepared by polymerizing styrene containing intimately dispersed therein not more than an equal weight of an adduct; said adduct being that of a bentonite with at least 3 weight percent of a high molecular weight vinylpyridine-containing polymer, said polymer being bound through pyridine groups to base exchange sites on the surfaces of said bentonite.

14. A grease comprising an organic lubricating oil gelled with less than an equal weight of an adduct; said adduct being that of a high surface area hydrophilic substance possessing ion exchange properties and free from non-ion exchange material with an amount, which is at least 3 weight percent and sufficient to decrease the hydrophilic nature of said substance, of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

15. A liquid organic surface coating composition containing from 1 to 25 pounds, per 100 gallons of said surface coating composition, of an adduct; said adduct being that of a high surface area hydrophilic substance possessing ion exchange properties with at least 3 weight percent of a cationic synthetic high polymer containing a substantially linear molecular chain derived by the polymerization of at least one monoolefinic compound through aliphatic unsaturation, said polymer being bound through basic groups to base exchange sites on the surfaces of said high surface area hydrophilic substance.

References Cited in the file of this patent
UNITED STATES PATENTS
2,625,529    Hedrick et al. _____ Jan. 13, 1953

UNITED STATES PATENT OFFICE
CERTIFICATE OF CORRECTION

Patent No. 2,795,545

June 11, 1957

Earl W. Gluesenkamp

It is hereby certified that error appears in the printed specification of the above numbered patent requiring correction and that the said Letters Patent should read as corrected below.

Column 8, line 49, for "N-vinylformamide" read --N-vinyldiformamide--; column 13, line 67, for "sale" read --shale--; column 14, line 74, for "at the" read --of the--; column 15, line 1, for "0.35" read --0.035--; line 22, before "increases" insert --spacing--; column 16, line 56, before "nitrobenzene" insert --in--; line 73, for "formamide" read --formation--.

Signed and sealed this 3rd day of December 1957.

(SEAL)
Attest:
KARL H. AXLINE

Attesting Officer

ROBERT C. WATSON
Commissioner of Patents